United States Patent
Smith et al.

(12)

(10) Patent No.: US 6,342,571 B1
(45) Date of Patent: Jan. 29, 2002

(54) HIGH REFRACTIVE INDEX OPTICAL RESIN COMPOSITION

(75) Inventors: Robert A. Smith, Murrysville; Michael O. Okoroafor, Export; Robert D. Herold, Monroeville, all of PA (US); T. Edwin Freeman, Penfield, NY (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/377,805

(22) Filed: Aug. 20, 1999

(51) Int. Cl.[7] ............... C08F 220/20; C08F 220/28; C08F 220/38
(52) U.S. Cl. ............... 526/286; 528/373; 528/376; 526/289; 526/307.1; 525/212; 252/586
(58) Field of Search ............... 252/586; 528/373, 528/376; 526/286, 289, 307.1; 525/212

(56) References Cited

U.S. PATENT DOCUMENTS

| | | |
|---|---|---|
| 3,361,706 A | 1/1968 | Meriwether et al. ......... 260/39 |
| 3,562,172 A | 2/1971 | Ono et al. ................. 252/300 |
| 3,567,605 A | 3/1971 | Becker ..................... 204/158 |
| 3,578,602 A | 5/1971 | Ono et al. ................. 252/300 |
| 4,166,043 A | 8/1979 | Uhlmann et al. ........... 252/300 |
| 4,215,010 A | 7/1980 | Hovey et al. .............. 252/300 |
| 4,342,668 A | 8/1982 | Hovey et al. .............. 252/586 |
| 4,367,170 A | 1/1983 | Uhlmann et al. ........... 252/586 |
| 4,637,698 A | 1/1987 | Kwak et al. ............... 351/163 |
| 4,816,584 A | 3/1989 | Kwak et al. ............... 344/71 |
| 4,818,096 A | 4/1989 | Heller et al. ............... 351/163 |
| 4,826,977 A | 5/1989 | Heller et al. ............... 544/70 |
| 4,880,667 A | 11/1989 | Welch ..................... 427/160 |
| 4,931,219 A | 6/1990 | Kwiatkowski et al. ...... 252/586 |
| 4,931,220 A | 6/1990 | Haynes et al. ............. 252/586 |
| 4,931,521 A | 6/1990 | Matsuda et al. ........... 526/286 |
| 5,066,818 A | 11/1991 | Van Gemert et al. ....... 549/389 |
| 5,183,917 A | 2/1993 | Maruyama et al. ......... 558/251 |
| 5,221,721 A | 6/1993 | Selvig .................... 526/193 |
| 5,238,931 A | 8/1993 | Yoshikawa et al. ......... 514/184 |
| 5,270,439 A | 12/1993 | Maruyama et al. ......... 528/373 |
| 5,274,132 A | 12/1993 | Van Gemert ............... 549/389 |
| 5,384,077 A | 1/1995 | Knowles .................. 252/586 |
| 5,384,379 A | 1/1995 | Bader et al. .............. 526/286 |
| 5,405,958 A | 4/1995 | Van Gemert ............... 544/71 |
| 5,422,422 A | 6/1995 | Bader et al. .............. 528/376 |
| 5,424,472 A | 6/1995 | Bader et al. .............. 558/250 |
| 5,429,775 A | 7/1995 | Kumar .................... 252/586 |
| 5,466,398 A | 11/1995 | Van Gemert et al. ....... 252/586 |
| 5,488,128 A | 1/1996 | Bader et al. .............. 558/251 |
| 5,739,243 A | 4/1998 | Herold et al. ............. 526/325 |
| 5,917,006 A | 6/1999 | Smith et al. .............. 428/373 |
| 5,976,422 A | 11/1999 | Okoroafor et al. ......... 252/586 |

FOREIGN PATENT DOCUMENTS

| | | |
|---|---|---|
| JP | 62-195383 | 8/1987 |
| WO | 96/38486 | 12/1996 |

OTHER PUBLICATIONS

Techniques in Chemistry, vol. III, "Photochromism," Chapter 3, Glenn H. Brown, Editor, John Wiley and Sons, Inc., New York, 1971.
American Standard Test Method No. D 542–95.
American Standard Test Method No. D 648–95.
American Standard Test Method No. D 1003–95.
The Bausch & Lomb ABBE–3L Refractometer, Operator's Manual, cover and p. 8.

*Primary Examiner*—David W. Wu
*Assistant Examiner*—Tanya Zalukaeva
(74) *Attorney, Agent, or Firm*—Carol A. Marmo; George D. Morris

(57) ABSTRACT

Polymerizable compositions comprising: (a) a mixture of thio(meth)acrylate functional monomers comprising, (a)(i) a first thio(meth)acrylate functional monomer, e.g., bis (thiomethacrylate)-1,2-ethylene, and (a)(ii) a second thio (meth)acrylate functional monomer, which is chain extended; (b) an aromatic monomer having at least two vinyl groups, e.g., divinyl benzene; (c) a polythiol monomer having at least two thiol groups, e.g., pentaerythritol tetrakis (3-mercaptopropionate); and (d) a comonomer selected from, (d)(i) an anhydride monomer having at least one ethylenically unsaturated group, e.g., methacrylic anhydride; (d) (ii) a monomer having at least three (meth) acryloyl groups, e.g., pentaerythritol tetrakis(acrylate); and (d)(iii) mixtures of monomers (d)(i) and (d)(ii). A polymerizate of the polymerizable composition has a refractive index of at least 1.57 and an Abbe number of at least 33.

32 Claims, No Drawings

HIGH REFRACTIVE INDEX OPTICAL RESIN COMPOSITION

DESCRIPTION OF THE INVENTION

The present invention relates to polymerizable organic compositions and polymerizates having a refractive index of at least 1.57 and an Abbe number of at least 33, which are prepared from such compositions. More particularly, the present invention relates to certain polymerizable organic compositions comprising a mixture of thio(meth)acrylate functional monomers, an aromatic monomer having at least two vinyl groups, a polythiol monomer having at least two thiol groups, and a comonomer selected from an anhydride monomer having at least one ethylenically unsaturated group and/or a monomer having at least three (meth)acryloyl groups.

Polymeric materials, such as plastics, have been developed as alternatives and replacements for silica based inorganic glass in applications such as, optical lenses, fiber optics, windows and automotive, nautical and aviation transparencies. These polymeric materials can provide advantages relative to glass, including, shatter resistance, lighter weight for a given application, ease of molding and ease of dying. Representative examples of such polymeric materials include, poly(methyl methacrylate), polycarbonate and poly(diethylene glycol bis(allylcarbonate)).

The refractive indices of many polymeric materials are generally lower than that of high index glass. For example, the refractive index of poly(diethylene glycol bis(allylcarbonate)) is about 1.50, compared to that of high index glass, which can range, for example, from 1.60 to 1.80. When fabricating lenses to correct a given degree of visual defect, e.g., a correction for myopia, the use of a polymeric material having a lower refractive index will require a thicker lens relative to a material having a higher refractive index, e.g., high index glass. If the degree of correction required is substantial, e.g., in the case of severe myopia, a lens fabricated from a low index polymeric material can become so thick as to negate any benefit of reduction in weight relative to an equivalent degree of correction obtained from a higher refractive index lens, e.g., a high index glass lens. In addition, thicker optical lenses are not aesthetically desirable.

Polymeric materials prepared from the polymerization of monomers containing aromatic rings typically have high refractive indices. However, articles, such as optical lenses, prepared from such high index polymeric materials generally have lower Abbe numbers (also known as nu-values). Lower Abbe numbers are indicative of an increasing level of chromatic dispersion, which is typically manifested as an optical distortion at or near the rim of the lens.

More recently, polymeric materials having a combination of high refractive indices, e.g., of at least 1.57, and low levels of chromatic dispersion, e.g., having Abbe numbers of at least 33, have been prepared from monomers containing sulfur atoms. While possessing a desirable combination of high refractive indices and Abbe numbers, such sulfur atom containing polymeric materials often have physical properties, e.g., heat and impact resistance, that are in some instances less than desirable. For example, the impact resistance of an optical lens is a particularly important safety related physical property, and improvements in impact resistance of optical lenses prepared from sulfur-containing polymeric materials are accordingly desirable.

There is, therefore, a need for the continued development of transparent polymerizates, in particular optical lenses, that possess a combination of high refractive index and adequately high Abbe numbers, e.g., preferably at least 33 and more preferably at least 35. It is further desirable that these polymeric materials also possess improved physical properties, such as thermal properties and impact resistance.

U.S. Pat. No. 5,917,006 describes a polymerizable organic composition comprising an aromatic monomer having at least two vinyl groups, e.g., divinyl benzene, a polythiol monomer having at least two thiol groups, e.g., pentaerythritol tetrakis(2-mercaptoacetate), and an anhydride monomer having at least one ethylenically unsaturated group, e.g., methacrylic anhydride. The '006 patent does not describe compositions comprising thioacrylate and/or thiomethacrylate functional monomers.

U.S. patent application Ser. No. 09/037,108, filed Mar. 9, 1998 (now U.S. Pat. No. 5,976,422) describes a polymerizable organic composition comprising at least one polymerizable monomer having at least two ethylenically unsaturated groups, e.g., divinyl benzene, a novel polythiol monomer, e.g., thioglycerol bis(2-mercaptoacetate), and optionally a monoethylenically unsaturated monomer, e.g., phenoxyethyl methacrylate, and/or an anhydride monomer, e.g., methacrylic anhydride. The compositions of the '108 application are not described as comprising thioacrylate and/or thiomethacrylate functional monomers.

U.S. Pat. No. 5,384,379 describes sulfur-containing polymethacrylates produced by the radical polymerization of the unrefined products resulting from the synthesis of a thio(meth)acrylic acid ester monomer. The '379 patent describes the radical polymerization of a monomer component having two thio(meth)acrylic acid ester groups and a chain extended monomer component having two thio(meth)acrylic acid ester groups.

U.S. Pat. No. 5,422,422 describes a high refractive index plastic produced by the reaction of an alkylthiol containing at least two thiol groups, and an alkylpolythiol ester, which contains at least two thiol groups esterified with (meth)acrylic acid. U.S. Pat. No. 4,931,521 describes a process for producing a high refractive index optical material from the radical polymerization of at least one polyfunctional thioacrylate or polyfunctional thiomethacrylate and optionally at least one other radically polymerizable monomer.

In accordance with the present invention, there is provided a polymerizable composition comprising:

(a) a mixture of thio(meth)acrylate functional monomers comprising,
  (i) a first thio(meth)acrylate functional monomer represented by the following general formula I,

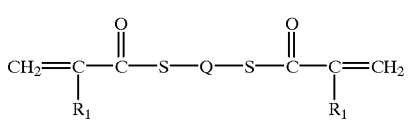

I in which $R_1$ is hydrogen or methyl, and Q is a divalent linking group selected from linear or branched $C_2$–$C_{12}$ alkylene, $C_4$–$C_{12}$ cyclic alkylene, $C_6$–$C_{14}$ arylene and $C_7$–$C_{26}$ alkarylene, the carbon chains of Q may optionally contain at least one linkage selected from the group consisting of ether, thioether and combinations thereof; and (ii) a second thio(meth)acrylate functional monomer represented by the following general formula II,

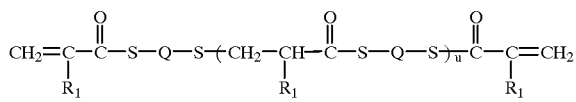

II in which $R_1$ and Q have the same meanings as described for monomer (a)(i), and u is an integer from 1 to 10, e.g., u may be an integer selected from 1, 2, 3, 4, 5, 6, 7, 8, 9, 10 and combinations thereof;

(b) an aromatic monomer having at least two vinyl groups;

(c) a polythiol monomer having at least two thiol groups; and (d) a comonomer selected from,
(i) an anhydride monomer having at least one ethylenically unsaturated group;
(ii) a monomer having at least three (meth)acryloyl groups represented by the following general formula III,

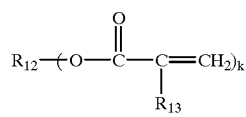

III in which $R_{12}$ is a polyvalent radical of a polyol, $R_{13}$ is hydrogen or methyl, and k is a whole number from 3 to 6; and (iii) mixtures of monomers (d)(i) and (d)(ii), wherein the amount of each monomer and comonomer are selected such that a polymerizate of said polymerizable composition has a refractive index of at least 1.57, as determined in accordance with American Standard Test Method (ASTM) number D542-95, and an Abbe number of at least 33, as determined using an appropriate instrument, e.g., a Bausch & Lomb ABBE-3L Refractometer.

Other than in the operating examples, or where otherwise indicated, all numbers or expressions referring to quantities of ingredients, reaction conditions, etc. used in the specification and claims are to be understood as modified in all instances by the term "about."

DETAILED DESCRIPTION OF THE INVENTION

Polymerizable compositions-according to the present invention comprise a mixture of thio(meth)acrylate functional monomers (a)(i) and (a)(ii) as described above. The mixture of thio(meth)acrylate functional monomers preferably contains a minor amount of the first thio(meth)acrylate functional monomer (a)(i) and a major amount of the second thio(meth)acrylate functional monomer (a)(ii). The first thio (meth)acrylate functional monomer (a)(i) is typically present in an amount of from 5 percent by weight to 49 percent by weight, preferably from 10 percent by weight to 45 percent by weight, and more preferably from 20 percent by weight to 40 percent by weight, based on the total weight of the mixture of thio(meth)acrylate functional monomers (a). The second thio(meth)acrylate functional monomer (a)(ii) is typically present in an amount of from 51 percent by weight to 95 percent by weight, preferably from 55 percent by weight to 90 percent by weight, and more preferably from 60 percent by weight to 80 percent by weight, based on the total weight of the mixture of thio(meth)acrylate functional monomers (a).

The weight ratio of the first thio(meth)acrylate functional monomer (a)(i) to the second thio(meth)acrylate functional monomer (a)(ii) in the polymerizable composition of the present invention is typically from 0.1:1.0 to 0.6:1.0, and preferably from 0.2:1.0 or 0.3:1.0 to 0.5:1.0. The relative amounts of the first and second thio(meth)acrylate functional monomers (a)(i) and (a)(ii) present in the composition may vary as described, and are typically selected such that the physical properties (e.g., refractive index, Abbe number, thermal properties, and in particular impact resistance) of a polymerizate prepared from the polymerizable composition are optimized.

The relative amounts of thio(meth)acrylate functional monomers (a)(i) and (a)(ii) present in the mixture of thio (meth)acrylate functional monomers (a) may be determined by methods known to the skilled artisan. Typically, this determination is accomplished by a comparison of the peak areas resulting from gel permeation chromatography (GPC) analysis of the mixture of thio(meth)acrylate functional monomers using polystyrene standards. As used herein and in the claims, the term "(meth)acrylate" and similar terms, e.g., "(meth)acryloyl," refers to methacrylates, acrylates and mixtures of methacrylates and acrylates.

With reference to general formulas I and II, examples of linear or branched $C_2$–$C_{12}$ alkylenes from which Q may be selected, include, but are not limited to, 1,2-ethylene, propylene (e.g., 1,3-propylene and 1,2-propylene), butylene (e.g., 1,4-butylene and 1,2-butylene), pentylene, hexylene, heptylene, octylene, nonylene, decylene, undecylene and dodecylene. Preferred $C_2$–$C_{12}$ alkylenes from which Q may be selected include 1,2-ethylene, 1,3-propylene and mixtures thereof. Examples of $C_4$–$C_{12}$ cyclic alkylenes from which Q may be selected, include, but are not limited to, cyclobutylene (e.g., 1,3-cyclobutylene), cyclopentylene (e.g., 1,2-cyclopentylene), cyclohexylene (e.g., 1,2-cyclohexylene), cycloheptylene, cyclooctylene, cyclononylene, cyclodecylene, cycloundecylene and cyclododecylene (e.g., 1,1-cyclododecylene). Examples of $C_6$–$C_{14}$ arylenes from which Q may be selected, include, but are not limited to, phenylene (e.g., 1,2-phenylene and 1,3-phenylene), naphthalenylene (e.g., 1,4-, 1,5-, 2,6- and 2,7-naphthalenylene), and anthracenylene (e.g., 1,3- and 9,10-anthracenylene). Examples of $C_7$–$C_{26}$ alkarylenes from which Q may be selected, include, but are not limited to, toluenylene (e.g., 3,4-toluenylene), and bis(phenylene) alkane (e.g., bis(phenylene)methane, 1,2-bis(phenylene) ethane, 2,2-bis(phenylene)propane and 1,3-bis(phenylene) propane).

With further reference to general formulas I and II, the divalent linking group Q is a residue of the polythiol or salt of the polythiol used in the synthesis of the mixture of monomers (a)(i) and (a)(ii). Examples of polythiols (and the corresponding salts derived from such polythiols) that may be used to synthesize the mixture of thio(meth)acrylate monomers of the composition of the present invention, include, but are not limited to, 1,2-ethanedithiol (1,2-ethylenedithiol), 2,2'-thiodiethanethiol, 1,3-propanedithiol, 1,4-butanedithiol, 2,3-butanedithiol, 1,5-pentanedithiol, 1,6-hexanedithiol, 1,8-octanedithiol, 1,9-nonanedithiol, 1,3-cyclobutanedithiol, 1,1-cyclobutanedithiol, 1,2-cyclopentanedithiol, 1,2-cyclohexanedithiol, 1,2-benzenedithiol, 1,3-benzenedithiol, 1,4-naphthalenedithiol, 1,5-naphthalenedithiol, 2,6-naphthalenedithiol, 2,7-naphthalenedithiol, 1,3-antracenedithiol, 9,10-antracenedithiol, 3,4-toluenedithiol, 4,5-dimethyl-o-xylene-α,α'-dithiol, bis(phenylthiol)methane, 1,3-bis(pheneylthio) propane and 2,2-bis(phenylthio)propane. Preferably, the polythiol(s) is selected from linear or branched $C_2$–$C_{12}$ alkanedithiols, e.g., 1,2-ethanedithiol and 1,3-propanedithiol.

The thio(meth)acrylate functional monomers (a)(i) and (a)(ii) may be prepared separately and then mixed together, or more preferably they are prepared concurrently within the same reaction vessel. The mixture of thio(meth)acrylate functional monomers is typically prepared, as is known to the skilled artisan, from the reaction of: (A) a polythiol, e.g., 1,2-ethanedithiol, or a salt of a polythiol, e.g., 1,2-ethanedithiol disodium salt; with (B) a (meth)acryloyl halide, e.g., (meth)acryloyl chloride, or (meth)acrylic anhydride. The relative amounts of monomers (a)(i) and (a)(ii) resulting from this reaction can be controlled by selecting the molar ratio of reactants (B) to (A). In the case when reactant (B) is (meth)acrylic anhydride, the molar ratio of reactants (B) to (A) is typically from 1.3:1 to 2.5:1, e.g., from 1.5:1 to 2.0:1.

A more detailed general method of preparing mixtures of thio(meth)acrylate monomers useful in the compositions of the present invention, in which Q is 1,2-ethylene and $R_1$ is methyl (with reference to general formulas I and II) is as follows. An aqueous solution containing approximately 18 percent by weight of 1,2-ethylenedithiol disodium salt (e.g., 336.2 parts by weight) is added slowly to a suitable reaction vessel containing methacrylic anhydride (e.g., 100 parts by weight) and a suitable solvent (e.g., 418.2 parts by weight of methylene chloride). The contents of the reaction vessel are mixed under a nitrogen sweep and at a temperature of from 15° C. to 30° C. during the salt addition. After completion of the 1,2-ethylenedithiol disodium salt addition, the contents of the reaction vessel are typically mixed for an additional 2 hours at a temperature of from 20° C. to 30° C. under nitrogen sweep. A post-addition of a small amount of methacrylic anhydride (e.g., 2.5 parts by weight) is made to the reaction vessel, followed by the addition of an aqueous solution containing 13 percent by weight of calcium chloride hexahydrate (e.g., 170 parts by weight). The contents of the reaction vessel are then stirred for at least 15 minutes under air.

Work-up of the contents of the reaction vessel typically involves separating out the organic phase, and adding to it a radical polymerization inhibitor (e.g., 0.0075 parts by weight of para-methoxy phenol). The organic phase is washed with an aqueous solution (e.g., 400 parts by weight of an aqueous solution containing 5 percent by weight calcium chloride hexahydrate), followed by removal of organic solvent by vacuum distillation. The product resulting from the described general synthetic method is a mixture of thiomethacrylate monomers comprising a minor amount of the first thiomethacrylate functional monomer (a)(i) (e.g., 35 percent by weight of monomer (a)(i), based on the total weight of monomers (a)(i) and (a)(ii)), and a major amount of at least one chain extended second thiomethacrylate functional monomer (a)(ii) for which u is an integer from 1 to 10 (e.g., 65 percent by weight of monomer (a)(ii), based on the total weight of monomers (a)(i) and (a)(ii)).

The mixture of thio(meth)acrylate functional monomers (a) are typically present in the composition of the present invention in an amount of at least 20 percent by weight, preferably at least 30 percent by weight, and more preferably at least 40 percent by weight, based on the total monomer weight of the polymerizable composition. Also, the mixture of thio(meth)acrylate functional monomers is typically present in the composition in an amount of less than 80 percent by weight, preferably less than 70 percent by weight, and more preferably less than 60 percent by weight, based on the total monomer weight of the polymerizable composition. The mixture of thio(meth)acrylate functional monomers (a) may be present in the polymerizable composition in an amount ranging between any combination of these values, inclusive of the recited values.

The composition of the present invention also comprises an aromatic monomer having at least two vinyl groups. Examples of aromatic monomers include, but are not limited to: divinyl benzene, e.g., 1,2-divinyl benzene, 1,3-divinyl benzene, 1,4-divinyl benzene and mixtures of structural isomers of divinyl benzene; diisopropenyl benzene, e.g., 1,2-diisopropenyl benzene, 1,3-diisopropenyl benzene, 1,4-diisopropenyl benzene and mixtures of structural isomers of diisopropenyl benzene; trivinyl benzene, e.g., 1,2,4-triethenyl benzene, 1,3,5-triethenyl benzene and mixtures of structural isomers of trivinyl benzene; divinyl naphthalene, e.g., 2,6-diethenyl naphthalene, 1,7-diethenyl naphthalene, 1,4-diethenyl naphthalene and mixtures of structural isomers of divinyl naphthalene; halogen substituted derivatives of divinyl benzene, diisopropenyl benzene, trivinyl benzene and divinyl naphthalene, e.g., 2-chloro-1,4-diethyenyl benzene; and mixtures of such aromatic monomers. In a particularly preferred embodiment of the present invention, the aromatic monomer is divinyl benzene.

The aromatic monomer having at least two vinyl groups is typically present in the polymerizable composition of the present invention in an amount of at least 5 percent by weight, preferably at least 10 percent by weight, and more preferably at least 15 percent by weight, based on the total monomer weight of the polymerizable composition. The aromatic monomer is also typically present in an amount of less than 65 percent by weight, preferably less than 47 percent by weight, and more preferably less than 30 percent by weight, based on the total monomer weight of the polymerizable composition. The aromatic monomer may be present in the polymerizable composition in an amount ranging between any combination of these values, inclusive of the recited values.

Also present in the compositions of the present invention is a polythiol monomer having at least two thiol groups. By "thiol group" is meant an —SH group which is capable of forming a covalent bond with an ethylenically unsaturated group, e.g., a vinyl group. As used herein and in the claims, the prefix "thio" (as in "thio(meth)acrylate functional monomer"), refers to a divalent sulfur atom (i.e., —S—) that is not covalently bonded to a hydrogen atom. The term "thiol group" and the prefix "thio" are accordingly distinguishable from each other in the present specification. Not intending to be bound by any theory, it is believed that covalent bonds are formed between the thiol groups and ethylenically unsaturated groups of the monomers of the present invention by means of a thiolene reaction mechanism, as it is known to those of ordinary skill in the art.

Examples of polythiols from which the polythiol monomer may be selected include, for example, 2,2'-thiodiethanethiol, pentaerythritol tetrakis(3-mercaptopropionate), pentaerythritol tetrakis(2-mercaptoacetate), tetrakis(7-mercapto-2,5-dithiaheptyl) methane, trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate), a polythiol monomer represented by the following general formula IV,

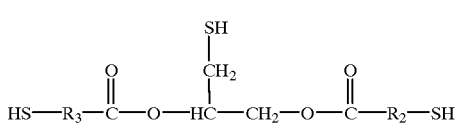

wherein $R_2$ and $R_3$ are each selected from the group consisting of straight or branched chain alkylene (usually containing from 1 to 20 carbon atoms, e.g., 1 to 10 carbon atoms, preferably 1 to 4 carbon atoms and more preferably 1 or 2 carbon atoms), cyclic alkylene (usually containing from 5 to 8 carbon atoms in the ring), phenylene and $C_1$–$C_9$ alkyl substituted phenylene, and mixtures of such polythiol monomers.

With reference to general formula IV, examples of straight or branched chain alkylene from which $R_2$ and $R_3$ may each be selected include, but are not limited to, methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Examples of cyclic alkylenes from which $R_2$ and $R_3$ may each be selected include, but are not limited to, cyclopentylene, cyclohexylene, cycloheptylene, cyclooctylene, and alkyl substituted derivatives thereof. The divalent linking groups $R_2$ and $R_3$ may also be selected from phenylene and $C_1$–$C_9$ alkyl substituted phenylene, e.g., methyl, ethyl, propyl, isopropyl and nonyl substituted phenylene. In a preferred embodiment of the present invention, $R_2$ and $R_3$ are each methylene or ethylene.

The polythiol monomer represented by general formula IV may be prepared from an esterification or transesterification reaction between 3-mercapto-1,2-propanediol (Chemical Abstract Service (CAS) Registry No. 96-27-5) and a thiol functional carboxylic acid or carboxylic acid ester in the presence of a strong acid catalyst, e.g., methane sulfonic acid, with the concurrent removal of water or alcohol from the reaction mixture.

As used herein, the polythiol monomer described and named with reference to general formula IV, e.g., thioglycerol bis(2-mercaptoacetate), is meant to include also any related co-product oligomeric species and polythiol monomer compositions containing residual starting materials. For example, when washing the reaction mixture resulting from the esterification of 3-mercapto-1,2-propanediol and a thiol functional carboxylic acid, e.g., 2-mercaptoacetic acid, with excess base, e.g., aqueous ammonia, oxidative coupling of thiol groups may occur. Such an oxidative coupling can result in the formation of oligomeric polythiol species having disulfide linkages, i.e., —S—S— linkages.

The polythiol monomer (c) is typically present in the compositions of the present invention in an amount of at least 5 percent by weight, preferably at least 10 percent by weight, and more preferably at least 15 percent by weight, based on the total monomer weight of the polymerizable composition. Polythiol monomer (c) is also typically present in the composition in an amount of less than 45 percent by weight, preferably less than 37 percent by weight, and more preferably less than 30 percent by weight, based on the total monomer weight of the polymerizable composition. The polythiol monomer may be present in the composition in an amount ranging between any combination of these values, inclusive of the recited values.

The composition of the present invention further comprises a comonomer (d), which may be selected from an anhydride monomer (d)(i) having at least one ethylenically unsaturated group. The anhydride monomer may be selected from methacrylic anhydride, acrylic anhydride, maleic anhydride, 1-cyclopentene-1,2-dicarboxylic anhydride, itaconic anhydride and mixtures thereof. In a preferred embodiment of the present invention, the anhydride monomer (d)(i) is methacrylic anhydride.

The comonomer (d) may also be selected from one or more monomers (d)(ii) having at least three (meth)acryloyl groups, as represented by general formula III. Comonomer (d)(ii) may be prepared by methods that are well known in the art. For example, monomer (d)(ii) is typically prepared by the esterification reaction between a polyol, e.g., trimethylolpropane, and a $C_1$ to $C_6$ alkyl (meth)acrylate, e.g., iso-butyl methacrylate. Preparation of the comonomer (d) (ii) represented by general formula III, is described in further detail in U.S. Pat. No. 5,739,243 at column 5, lines 7–26, which disclosure is incorporated herein by reference.

Examples of polyols suitable for use in preparing comonomer (d)(ii) include, but are not limited to, glycerol, trimethylolpropane, 1,3,5-tris(2-hydroxyethyl)isocyanurate, di-trimethylolpropane, pentaerythritol and dipentaerythritol. A particularly preferred comonomer (d)(ii) may be defined with reference to general formula III wherein $R_{12}$ is a radical of pentaerythritol, $R_{13}$ is hydrogen, and k is 3 or 4.

As used herein, and with reference to general formula III, the phrase "$R_{12}$ is a polyvalent radical of a polyol" is meant to refer to the polyvalent residue of the polyol used in preparing comonomer (d)(ii). For example, in the case of pentaerythritol tetraacrylate (for which k is 4 and $R_{13}$ is hydrogen), $R_{12}$ is the tetravalent radical of pentaerythritol, i.e., tetramethylenemethane.

Comonomer (d) is typically present in the composition of the present invention in an amount of at least 1 percent by weight, preferably at least 1.5 percent by weight, and more preferably at least 2 percent by weight, based on the total monomer weight of the polymerizable composition. Comonomer (d) is typically present in the composition in an amount of less than 30 percent by weight, preferably less than 25 percent by weight, and more preferably less than 20 percent by weight, based on the total monomer weight of the polymerizable composition. Comonomer (d) may be present in the composition in an amount ranging between any combination of these values, inclusive of the recited values.

The polymerizable composition of the present invention may optionally further comprise a radically polymerizable comonomer (e). Comonomer (e) may be selected from the group consisting of:

(e)(i) a monomer represented by the following general formula V,

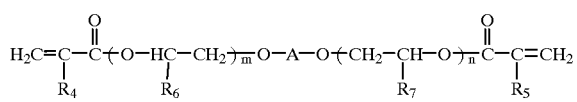

wherein m and n are each a positive number, the sum of m and n being from 0 to 70, $R_4$ and $R_5$ are each hydrogen or methyl, $R_6$ and $R_7$ are each hydrogen or $C_1$ to $C_2$ alkyl, and A is a divalent linking group selected from the group consisting of linear or branched $C_3$–$C_8$ alkylene, cyclic alkylene (usually containing from 5 to 12 carbon atoms), phenylene, $C_1$–$C_9$ alkyl substituted phenylene, and a group represented by the following general formula VI,

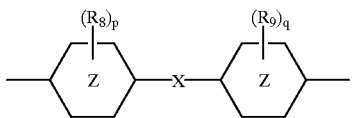

wherein, $R_8$ and $R_9$ are each $C_1$–$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—,

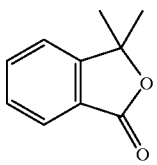

—C(CH$_3$)(C$_6$H$_5$)— or when

is the divalent benzene group, and X is O, S, —CH$_2$—, or —C(CH$_3$)$_2$— when

is the divalent cyclohexane group;
(e)(ii) a bis[(meth)acryloyl-terminated]poly(ethylene glycol) monomer having a number average molecular weight from 200 to 2000 grams/mole;
(e)(iii) a poly(meth)acryloyl terminated monomer represented by the following general formula VII,

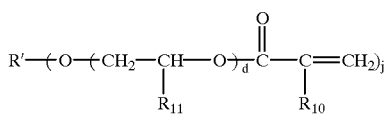

wherein R' is a polyvalent radical of a polyol (e.g., trimethylolpropane), $R_{10}$ is hydrogen or methyl, $R_{11}$ is hydrogen or $C_1$ to $C_2$ alkyl (preferably hydrogen), d is a number from 1 to 20, and j is a whole number from 3 to 6 (e.g. 3 or 4, and preferably 3); and
(e)(iv) mixtures of polymerizable comonomers (e)(i), (e)(ii) and (e)(iii).

The comonomer (e)(i) represented by general formula V may be prepared by methods that are well known in the art. When the sum of m and n is greater than 0, one such commonly used method involves the alkoxylation of a diol, e.g., 4,4'-isopropylidene diphenol, followed by esterification of the alkoxylated diol with a $C_1$ to $C_6$ alkyl (meth)acrylate. Classes of diols that may be used to prepare comonomer (e)(i) include, but are not limited to: linear or branched $C_3$–$C_8$ alkylenediols, e.g., 1,2-propylenediol, 1,3-propylenediol and octylenediol; cyclic alkylenediols, e.g., 1,4-cyclohexanediol; phenylene diols, such as ortho, meta and para dihydroxy benzene; $C_1$–$C_9$ alkyl substituted phenylene diols, e.g., 2,6-dihydroxytoluene and 3-methylcatechol; dihydroxybiphenyls, such as 4,4'-dihydroxybiphenyl; bisphenols such as 4,4'-isopropylidene diphenol; halogenated bisphenols, such as 4,4'-isopropylidenebis(2,6-dibromophenol); and biscyclohexanols, which can be prepared by hydrogenating the corresponding bisphenols, such as 4,4'-isopropylidenebiscyclohexanol. A preferred class of diols are the bisphenols, a particularly preferred example of which is 4,4'-isopropylidene diphenol. Preparation of the comonomer (e)(i) represented by general formula V is described in further detail in U.S. Pat. No. 5,279,243 at column 4, lines 24–63, which disclosure is incorporated herein by reference.

In a preferred embodiment of the present invention, with reference to general formulas V and VI, X is —C(CH$_3$)$_2$—,

represents a divalent benzene group, p and q are each 0, $R_4$ and $R_5$ are each methyl, $R_6$ and $R_7$ are each hydrogen, and the sum of m and n is from 10 to 30. Comonomer (e) is preferably selected from comonomer (e)(i).

Comonomer (e)(ii) can be prepared, as is known to the artisan, from an esterification or transesterification reaction between poly(ethylene glycol) and an alpha—beta ethylenically unsaturated acid or ester such as methacrylic acid, a $C_1$ to $C_6$ alkyl methacrylate, acrylic acid, a $C_1$ to $C_6$ alkyl acrylate, or a combination thereof. The bis[(meth)acryloyl-terminated]poly(ethylene glycol) monomer, preferably has a number average molecular weight from 200 to 1200, more preferably from 500 to 700, grams/mole, as determined by gel permeation chromatography using polystyrene standards. A particularly preferred comonomer (e)(ii) is a bis-methacrylate of polyethylene glycol, having a number average molecular weight of 600 grams/mole.

Comonomer (e)(iii), as previously described with reference to general formula VII, may be prepared by methods that are well known in the art. For example, comonomer (e)(iii) is typically prepared by alkoxylating a polyol, e.g., trimethylolpropane, followed by esterification of the alkoxylated polyol with a $C_1$ to $C_6$ alkyl (meth)acrylate. Preparation of the comonomer (e)(iii) represented by general formula VII is described in further detail in U.S. Pat. No. 5,739,243 at column 5, lines 7–26, which disclosure is incorporated herein by reference. Examples of polyols suitable for use in preparing comonomer (e)(iii) include, but are not limited to, those as recited previously herein with regard to comonomer (d)(ii) as described with reference to general formula III.

When present in the polymerizable composition, comonomer (e) is typically present in an amount of at least 2 percent by weight, preferably at least 2.5 percent by weight, and more preferably at least 5 percent by weight, based on the total monomer weight of the polymerizable composition. Also, comonomer (e) may be present in the composition in an amount of less than 35 percent by weight, preferably less than 25 percent by weight, and more preferably less than 15 percent by weight, based on the total monomer weight of the polymerizable composition. The polymerizable composition of the present invention may optionally contain comonomer (e) in an amount ranging between any combination of these values, inclusive of the recited values.

The polymerizable composition may further optionally comprise a monomer having a single ethylenically unsaturated radically polymerizable group. Examples of monomers having a single ethylenically unsaturated radically polymerizable group that may optionally be present in the composition include, but are not limited to, acrylic acid; methacrylic acid; esters of acrylic acid such as methyl or ethyl acrylate and 2-hydroxyethyl acrylate; esters of methacrylic acid, such as methyl or ethyl methacrylate, phenoxyethyl methacrylate, isobornyl methacrylate, cyclohexyl methacrylate and 2-hydroxyethyl methacrylate; allyl esters, e.g., allyl benzoate; allyl carbonates, e.g., phenyl allyl carbonate; vinyl esters such as vinyl acetate; styrene; and vinyl chloride. Preferred monoethylenically unsaturated monomers include, methyl methacrylate, isobornyl methacrylate, phenoxyethyl methacrylate, cyclohexyl methacrylate, styrene and mixtures thereof. The monoethylenically unsaturated monomer, when used, is typically present in an amount of from 1 percent by weight, to 20 percent by weight, based on the total monomer weight of the polymerizable composition, e.g., from 3 percent by weight to 7 percent by weight, based on the total monomer weight of the polymerizable composition.

The total amount of all monomers and comonomers present in the polymerizable composition of the present invention add up to 100 percent by weight. In an embodiment of the present invention, for example, the polymerizable composition comprises: from 20 percent by weight to 80 percent by weight of the thio(meth)acrylate monomer mixture (a); from 5 percent by weight to 65 percent by weight of the aromatic monomer (b); from 5 percent by weight to 45 percent by weight of the polythiol monomer (c); and from 1 percent by weight to 30 percent by weight of the comonomer (d), the amount of all monomers (a) through (d) being based on the total monomer weight of the polymerizable composition.

Polymerization of the polymerizable composition of the present invention may be accomplished by adding to the composition an initiating amount of material capable of generating free radicals, such as organic peroxy compounds or azobis(organonitrile) compounds, i.e., an initiator. Methods for polymerizing compositions having therein monomers containing radically polymerizable groups are well known to the skilled artisan and any of those well known techniques may be used to polymerize the afore described polymerizable compositions. Such polymerization methods include thermal polymerization, photopolymerization or a combination thereof.

Examples of suitable organic peroxy compounds, that may be used as thermal polymerization initiators include: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauryl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. Preferred thermal initiators are those that do not discolor the resulting polymerizate. A particularly preferred thermal initiator is 1,1-di-(t-butyl peroxy)-3,3,5-trimethylcyclohexane, which is commercially available from Elf Atochem under the tradename LUPERSOL® 231.

Examples of suitable azobis(organonitrile) compounds, that may be used as thermal polymerization initiators include azobis(isobutyronitrile) and azobis(2,4-dimethylvaleronitrile).

The amount of thermal polymerization initiator used to initiate and polymerize the polymerizable composition of the present invention may vary and will depend on the particular initiator used. Only that amount that is required to initiate and sustain the polymerization reaction is required, i.e., an initiating amount. With respect to the preferred peroxy compound, 1,1-di-(t-butyl peroxy)-3,3,5-trimethylcyclohexane, typically between 0.01 and 3.0 parts of that initiator per 100 parts of monomers (phm) present in the polymerizable composition may be used. More usually, between 0.05 and 1.0 phm is used to initiate the polymerization. Typically, the thermal cure cycle involves heating the polymerizable composition in the presence of the initiator from room temperature to 85° C. to 130° C. over a period of from 2 hours to 48 hours.

Photopolymerization of the polymerizable composition may be carried out in the presence of a photopolymerization initiator using ultraviolet light, visible light, or a combination thereof. Examples of suitable photopolymerization initiators include benzoin, benzoin methyl ether, benzoin isobutyl ether, benzophenone, acetophenone, 4,4'-dichlorobenzophenone, diethoxyacetophenone, 2-hydroxy-2-methyl-1-phenylpropan-1-one, 1-hydroxycyclohexyl phenyl ketone, 2-isopropylthixanthone and 2,4,6-trimethylbenzoyldiphenylphosphine oxide. The amount of photopolymerization initiator used to initiate and polymerize the polymerizable organic compositions of the present invention vary and will depend on the particular initiator used. Only that amount that is required to initiate and sustain the polymerization reaction is required, i.e., an initiating amount. A preferred photopolymerization initiator is diphenyl (2,4,6-trimethylbenzoyl)phosphine oxide. The photopolymerization initiator is typically used in an amount from 0.01 percent to 2 percent by weight, based on the total weight of monomer components.

The light source used for the photopolymerization is preferably selected from those which emit ultraviolet light. The light source is preferably a mercury lamp, a germicidal lamp or a xenon lamp. Visible light, e.g., sunlight, may also be used. The exposure time may differ depending upon, e.g., the wavelength and intensity of the light source and the shape of the mold, and is typically determined empirically.

The amount of thermal polymerization initiator or photopolymerization initiator and/or the consequent cure cycle should be adequate to produce a polymerizate according to the present invention which has an initial (zero second) Barcol hardness of at least 1, preferably at least 4, e.g., from 4 to 35.

It should be understood that the polymerizable composition of the present invention may be polymerized in the absence of a polymerization initiator. In particular, photopolymerization of the polymerizable composition may be achieved in the absence of any externally added photopolymerization or thermal initiators.

Various conventional additives may be incorporated with the polymerizable composition of the present invention. Such additives may include light stabilizers, heat stabilizers, antioxidants, ultraviolet light absorbers, mold release agents, static (non-photochromic) dyes, photochromic dyes or substances, pigments, and flexibilizing additives that are not radically polymerizable (e.g., alkoxylated phenol benzoates, poly(alkylene glycol) dibenzoates, and poly(alkoxylated) bisphenols). Antiyellowing additives, e.g., 3-methyl-2-butenol, organo pyrocarbonates and triphenyl phosphite (CAS registry no. 101-02-0), may also be added to polymerizable compositions of the present invention to enhance resistance to yellowing. Such additives are typically present in the compositions of the present invention in amounts totaling less than 10% by weight, preferably less than 5% by weight, and more preferably less than 3% by weight, based on the total weight of the polymerizable composition.

It is also contemplated that a polymerization moderator, or mixtures of polymerization moderators, may be added to the polymerizable composition of the present invention to minimize the formation of distortions, such as striations, in polymerizates obtained therefrom. Suitable polymerization moderators include for example, dilauryl thiodipropionate, terpinolene, 1-isopropyl-4-methyl-1,4-cyclohexadiene, 1-isopropyl-4-methyl-1,3-cyclohexadiene, alpha-methyl styrene, 2,4-diphenyl-4-methyl-1-pentene, 1,1-diphenylethylene, cis-1,2-diphenylethylene, 2,6-dimethyl-2,4,6-octatriene, 4-tert-butylpyrocatechol, and mixtures thereof. The polymerization moderator may be added to the polymerizable composition in an amount from 0.01 percent to 10 percent by weight, preferably from 0.1 percent to 8 percent by weight and more preferably from 0.3 percent to 5 percent by weight, based on the total weight of the polymerizable composition.

Polymerizates obtained from polymerization of polymerizable compositions of the present invention will be solid, and preferably transparent, e.g., suitable for optical or ophthalmic applications. The polymerizates of the present invention will also have a refractive index of at least 1.57, preferably at least 1.58 and more preferably at least 1.59, adequately high Abbe numbers, e.g., an Abbe number of at least 33 and preferably at least 35, and an initial (zero second) Barcol hardness of at least 1. Solid articles that may be prepared from polymerizable compositions of the present invention include, but are not limited to, optical lenses, such as plano and ophthalmic lenses, sun lenses, windows, automotive transparencies, e.g., windshields, sidelights and backlights, and aircraft transparencies, etc.

When used to prepare photochromic articles, e.g., lenses, the polymerizate should be transparent to that portion of the electromagnetic spectrum which activates the photochromic substances) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be utilized with the polymerizates of the present invention are organic photochromic compounds or substances containing same that may be either (a) incorporated (e.g., dissolved, dispersed or diffused) into such polymerizates; or (b) added to the polymerizable composition prior to polymerization.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro(indoline)benzoxazines. These and other classes of such photochromic substances are described in the open literature. See for example, U.S. Pat. Nos. : 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithizonates, i.e., (arylazo)-thioformic arylhydrazidates, e.g., mercury dithizonates, which are described in, for example, U.S. Pat. No. 3,361,706. Fulgides and fulgimides, e.g. the 3-furyl and 3-thienyl fulgides and fulgimides, are described in U.S. Pat. No. 4,931,220 at column 20, line 5 through column 21, line 38.

The disclosures relating to such photochromic substances in the afore described patents are incorporated herein, in toto, by reference. The photochromic articles of the present invention may contain one photochromic substance or a mixture of photochromic substances, as desired. Mixtures of photochromic substances may be used to attain certain activated colors such as a near neutral gray or brown.

Each of the photochromic substances described herein may be used in amounts and in ratios (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film or polymer layer; and applying the photochromic substance as part of a coating or polymer layer placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance(s) or composition containing photochromic substance(s) applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

It is also contemplated that photochromic substances may be added to the polymerizable compositions of the present invention prior to curing. However, when this is done it is preferred that the photochromic substance(s) be resistant to potentially adverse interactions with initiator(s) that may be present and/or the polythiol monomer and the sulfide linkages that form within the polymerizate. These adverse interactions can result in deactivation of the photochromic substance(s), e.g., by trapping them in either an open or closed form. Photochromic substances can also include photochromic pigments and organic photochromic substances encapsulated in metal oxides, the latter of which are described in U.S. Pat. Nos. 4,166,043 and 4,367,170. Organic photochromic substances sufficiently encapsulated within a matrix of an organic polymerizate, as described in U.S. Pat. No. 4,931,220, may also be incorporated into the polymerizable compositions of the present invention prior to curing.

The present invention is more particularly described in the following examples, which are intended to be illustrative only, since numerous modifications and variations therein will be apparent to those skilled in the art. Unless otherwise specified, all parts and percentages are by weight.

Polymerizable Casting Compositions

Casting compositions were prepared from the ingredients enumerated in Table 1. Examples 1 and 2 are comparative examples and Examples 3 and 4 are representative of embodiments of the present invention. In Table 1, the following abbreviations are used: divinyl benzene (DVB); pentaerythritol tetrakis(3-mercaptopropionate) (PTMP); methacrylic anhydride (MAAn); and Bisphenol A dimethacrylate ethoxylated with 10 moles of ethylene oxide (BPA(10EO)DMA).

TABLE 1

Casting Compositions

| | Example 1 | Example 2 | Example 3 | Example 4 |
|---|---|---|---|---|
| Mixture of thiomethacrylate functional monomers (a) | 100.0 | 0 | 50.0 | 47.5 |
| DVB monomer | 0 | 47.0 | 23.5 | 22.3 |
| PTMP monomer | 0 | 47.0 | 23.5 | 22.3 |
| MAAn monomer | 0 | 6.0 | 3.0 | 2.9 |
| BPA(10EO)DMA monomer (b) | 0 | 0 | 0 | 5.0 |
| LUPERSOL 231 initiator (c) | 0.2 | 0.2 | 0.2 | 0.2 |

(a) The mixture of thiomethacrylate functional monomers was prepared according to the general method as described previously in the specification, and with reference to general formulas I and II, Q is 1,2-ethylene and $R_1$ is methyl. The mixture of thiomethacrylate functional monomers was analyzed by GPC and determined (by means of a comparison of peak areas) to be composed of about 35 percent by weight of the first thiomethacrylate functional monomer (a) (i), and about 65 percent by weight of a mixture of second thiomethacrylate functional monomers (a) (ii), based on the total weight of mixture of thiomethacrylate functional monomers. The mixture of thiomethacrylate functional monomers had a spindle viscosity of 120 centiPoise (cPs).
(b) SR-480, a BPA(10EO)DMA monomer obtained commercially from Sartomer.
(c) LUPERSOL 231 - an initiator having the reported chemical formula of 1,1-di(tert-butylperoxy)-3,3,5-trimethylcyclohexane, CAS Registry No. 6731-36-8, which is available commercially from Elf Atochem.

Thermally polymerized cast sheets of the polymerizable casting compositions represented by Examples 1–4 of Table 1 were made in the following manner. The ingredients as listed were first charged to a suitable vessel followed by the addition of the LUPERSOL 231 initiator. The resulting initiated polymerizable casting composition was mixed using a magnetic stir plate and magnetic stir bar at ambient room temperature, passed through a 5 micron filter, and degassed in a vacuum chamber at about 100 mm Hg. The mixed casting compositions were then poured into glass molds having interior dimensions of (a) 15.24×15.24×0.32 cm, and (b) 15.24×15.24×0.16 cm. The filled molds were cured according to the following sequential thermal cure cycle: (1) heating from 40° C. to 125° C. at a constant rate over a period of 15 hours; (2) isothermal hold at 125° C. for 1 hour; and (3) cooling from 125° C. to 95° C. at a constant rate over a period of 2.5 hours; end of cycle.

Physical properties of the cast sheets were measured and the results are summarized in Table 2. The 0.16 cm thick cast sheets were only used for impact test evaluations, while the 0.32 cm thick cast sheets were used for all other physical property testing.

TABLE 2

Physical Data Relating to Examples 1–4

| Physical Test | Example 1 | Example 2 | Example 3 | Example 4 |
|---|---|---|---|---|
| Heat Distortion Temperature (d) (° C. @ 10 mils) | 57 | 76 | 83 | 73 |
| Total Deflection (e) (mils) @ 130° C. | 34 | 52 | 26 | 34 |
| Refractive Index (f) ($n_D^{20}$) | 1.6128 | 1.5953 | 1.6015 | 1.5980 |
| Abbe Number (g) | 36.5 | 35.0 | 36.0 | 36.0 |
| % Transmittance (h) | 89.84 | 90.93 | 90.59 | 90.72 |

TABLE 2-continued

Physical Data Relating to Examples 1–4

| Physical Test | Example 1 | Example 2 | Example 3 | Example 4 |
|---|---|---|---|---|
| Impact Test Failure Point (Joules) (i) | 0.20 | 0.41 | 0.61 | 0.61 |

(d) Heat Distortion Temperature is the temperature at which the test specimen was observed to have a deflection of 10 mils (254 microns), and was determined in accordance with ASTM D 648-95 using a Custom Scientific Instruments Model HDV3 DTUL/Vicat Softening Point Apparatus.
(e) Total Deflection at 130° C. is the total deflection (in units of mils) of the test specimen that was observed at this temperature, and was determined in accordance with ASTM D 648-95 using a Custom Scientific Instruments Model HDV3 DTUL/Vicat Softening Point Apparatus.
(f) Refractive Index $n_D^{20}$ was determined in accordance with ASTM D542-95, using a Bausch & Lomb Abbe-3L Refractometer.
(g) Abbe Number was determined using a Bausch & Lomb ABBE-3L Refractometer.
(h) Percent (%) Transmittance was determined in accordance with ASTM D 1003-95, using a HunterLab model ColorQuest II spectrophotometer.
(i) For each of Examples 1–4, nine (9) 3.8 cm × 3.8 cm × 0.16 cm test sheets were tested at an impact energy of 0.20 Joules (0.15 foot-pound), those samples that did not fail at 0.20 Joules were further tested at an impact strength of 0.41 Joules (0.30 foot-pound), and those that did not fail at 0.41 Joules were still further tested at 0.61 Joules (0.45 foot-pound). The impact energy at which the last (or all) of the original nine test samples were observed to fail, is the impact test failure point value listed in Table 2 (higher values are more desirable). The 0.20 Joules impact energy tests were performed by dropping a 16.3 gram, 15.9 mm diameter stainless steel ball from a height of 127 cm onto the center of a test sheet supported on an O-ring having a diameter of 2.9 cm. The 0.41 and 0.61 Joules impact energy tests were performed with the test sheets mounted as described for the 0.20 Joule test, however a 16.3 gram stainless steel bullet was fired vertically down at the test sheets with a predetermined and calibrated level of pressurized air. When the impact projectile (16.3 gram ball or bullet) was observed to have driven a hole through the test sheet or caused the test sheet to fall into pieces, that test sheet was determined to have failed the impact test.

The results summarized in Table 2 show that polymerizable compositions according to the present invention, i.e., Examples 3 and 4, have physical properties (e.g., thermal properties, a combination of high refractive index and Abbe values, and percent transmittance) at least comparable to those of comparitive compositions, e.g., Examples 1 and 2. In particular, polymerizable compositions according to the present invention, i.e., Examples 3 and 4, also have improved impact strength relative to comparative compositions, i.e., Examples 1 and 2.

The present invention has been described with reference to specific details of particular embodiments thereof. It is not intended that such details be regarded as limitations upon the scope of the invention except insofar as and to the extent that they are included in the accompanying claims.

We claim:
1. A polymerizable composition comprising:
(a) a mixture of thio(meth)acrylate functional monomers comprising,
(i) a first thio(meth)acrylate functional monomer represented by the following general formula,

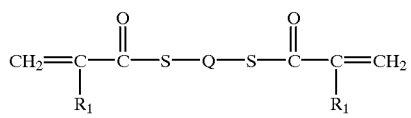

in which $R_1$ is hydrogen or methyl, and Q is a divalent linking group selected from linear or branched $C_2$–$C_{12}$ alkylene, $C_4$–$C_{12}$ cyclic alkylene, $C_6$–$C_{14}$ arylene and $C_7$–$C_{26}$ alkarylene, the carbon chains of Q may optionally contain at least one linkage selected from the group consisting of ether, thioether and combinations thereof; and
(ii) a second thio(meth)acrylate functional monomer represented by the following general formula,

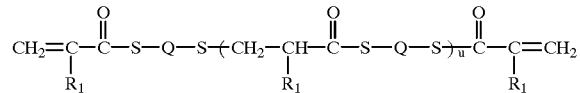

in which $R_1$ and Q have the same meanings as described for monomer (a)(i), and u is an integer from 1 to 10;
(b) an aromatic monomer having at least two vinyl groups;
(c) a polythiol monomer having at least two thiol groups; and
(d) a comonomer selected from,
(i) an anhydride monomer having at least one ethylenically unsaturated group;
(ii) a monomer having at least three (meth)acryloyl groups represented by the following general formula,

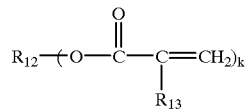

in which $R_{12}$ is a polyvalent radical of a polyol, $R_{13}$ is hydrogen or methyl, and k is a whole number from 3 to 6; and
(iii) mixtures of monomers (d)(i) and (d)(ii), wherein the amount of each monomer and comonomer are selected such that a polymerizate of said polymerizable composition has a refractive index of at least 1.57 and an Abbe number of at least 33.
2. The polymerizable composition of claim 1 wherein Q is selected from linear or branched $C_2$–$C_{12}$ alkylene.
3. The polymerizable composition of claim 2 wherein Q is selected from 1,2-ethylene, 1,3-propylene and mixtures thereof, and $R_1$ is methyl.
4. The polymerizable composition of claim 1 wherein said mixture of thio(meth)acrylate functional monomers (a) comprises a major amount of said second thio(meth)acrylate functional monomer (a)(ii).
5. The polymerizable composition of claim 4 wherein said first thio(meth)acrylate functional monomer (a)(i) is present in an amount of from 5 percent to 49 percent by weight, based on the total weight of said mixture of thio(meth)acrylate functional monomers, and said second thio(meth)acrylate functional monomer (a)(ii) is present in an amount of from 51 percent to 95 percent by weight, based on the total weight of said mixture of thio(meth)acrylate functional monomers.
6. The polymerizable composition of claim 1 wherein said aromatic monomer is selected from the group consisting of divinyl benzene, diisopropenyl benzene, trivinyl benzene, divinyl naphthalene, halogen substituted derivatives of divinyl benzene, diisopropenyl benzene, trivinyl benzene and divinyl naphthalene, and mixtures thereof.
7. The polymerizable composition of claim 6 wherein said aromatic monomer is divinyl benzene.
8. The polymerizable composition of claim 1 wherein said polythiol monomer is selected from the group consisting of 2,2'-thiodiethanethiol, pentaerythritol tetrakis(3-mercaptopropionate), pentaerythritol tetrakis(2-mercaptoacetate), tetrakis(7-mercapto-2,5-dithiaheptyl)methane, trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate), a polythiol monomer represented by the following general formula,

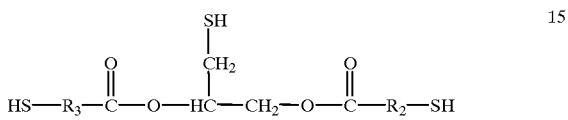

wherein $R_2$ and $R_3$ are each selected from the group consisting of straight or branched chain alkylene, cyclic alkylene, phenylene and $C_1$–$C_9$ alkyl substituted phenylene, and mixtures of such polythiol monomers.

9. The polymerizable composition of claim 1 wherein said anhydride monomer (d)(i) is selected from the group consisting of methacrylic anhydride, acrylic anhydride, maleic anhydride, 1-cyclopentene-1,2-dicarboxylic anhydride, itaconic anhydride and mixtures thereof; $R_{12}$ of monomer (d)(ii) is a radical of pentaerythritol, $R_{13}$ is hydrogen and k is 3 or 4.

10. The polymerizable composition of claim 9 wherein said anhydride monomer is methacrylic anhydride.

11. The polymerizable composition of claim 1 wherein said thio(meth)acrylate monomer mixture (a) is present in an amount of from 20 percent by weight to 80 percent by weight; said aromatic monomer (b) is present in an amount of from 5 percent by weight to 65 percent by weight; said polythiol monomer (c) is present in an amount of from 5 percent by weight to 45 percent by weight; and said comonomer (d) is present in an amount of from 1 percent by weight to 30 percent by weight, the amount of all monomers (a) through (d) being based on the total monomer weight of said polymerizable composition.

12. The polymerizable composition of claim 1 further comprising a radically polymerizable comonomer (e) selected from the group consisting of:

(i) a monomer represented by the following general formula,

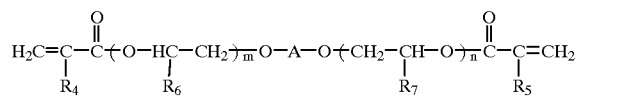

wherein m and n are each a positive number, the sum of m and n being from 0 to 70, $R_4$ and $R_5$ are each hydrogen or methyl, $R_6$ and $R_7$ are each hydrogen or $C_1$ to $C_2$ alkyl, and A is a divalent linking group selected from the group consisting of linear or branched $C_3$–$C_8$ alkylene, cyclic alkylene, phenylene, $C_1$–$C_9$ alkyl substituted phenylene, and a group represented by the following general formula,

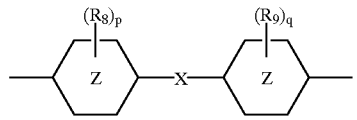

wherein $R_8$ and $R_9$ are each $C_1$–$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—, —C(CH$_3$)(C$_6$H$_5$)— or

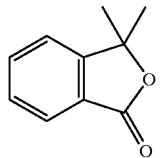

when

is the divalent benzene group, and X is O, S, —CH$_2$—, or —C(CH$_3$)$_2$— when

is the divalent cyclohexane group;

(ii) a bis[(meth)acryloyl-terminated]poly(ethylene glycol) monomer having a number average molecular weight from 200 to 2000 grams/mole;

(iii) a poly(meth)acryloyl terminated monomer represented by the following general formula,

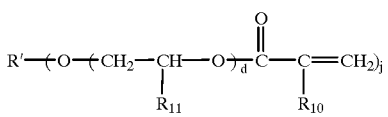

wherein R' is a polyvalent radical of a polyol, $R_{10}$ is hydrogen or methyl, $R_{11}$ is hydrogen or $C_1$ to $C_2$ alkyl, d is a number from 1 to 20, and j is a whole number from 3 to 6; and (iv) mixtures of polymerizable comonomers (i), (ii) and (iii).

13. The polymerizable composition of claim 12 wherein A is represented by the following general formula,

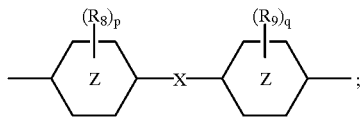

X is —C(CH$_3$)$_2$—;

represents a divalent benzene group; p and q are each 0; R$_4$, R$_5$ and R$_{10}$ are each methyl; R$_6$, R$_7$ and R$_{11}$ are each hydrogen; the sum of m and n is from 10 to 30; R' is a radical of trimethylolpropane; and j is 3.

14. The polymerizable composition of claim 13 wherein said radically polymerizable comonomer (e) is present in an amount of from 2 percent to 35 percent by weight, based on the total monomer weight of said polymerizable organic composition.

15. The polymerizable composition of claim 1 further comprising a monomer having a single ethylenically unsaturated radically polymerizable group that is different than comonomer (d)(i).

16. The polymerizable composition of claim 15 wherein said monomer having a single ethylenically unsaturated radically polymerizable group is selected from the group consisting of methyl methacrylate, isobornyl methacrylate, phenoxyethyl methacrylate, cyclohexyl methacrylate, styrene and mixtures thereof.

17. A polymerizable composition comprising:
(a) a mixture of thio(meth)acrylate functional monomers comprising,
  (i) a first thio(meth)acrylate functional monomer represented by the following general formula,

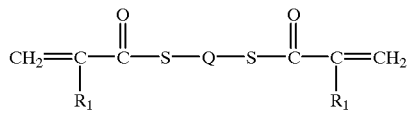

in which R$_1$ is hydrogen or methyl, and Q is a divalent linking group selected from linear or branched C$_2$–C$_{12}$ alkylene, C$_4$–C$_{12}$ cyclic alkylene, C$_6$–C$_{14}$ arylene and C$_7$–C$_{26}$ alkarylene, the carbon chains of Q may optionally contain at least one linkage selected from the group consisting of ether, thioether and combinations thereof; and
  (ii) a second thio(meth)acrylate functional monomer represented by the following general formula,

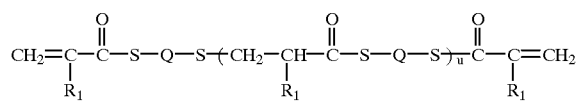

in which R$_1$ and Q have the same meanings as described for monomer (a)(i), and u is an integer from 1 to 10;
(b) an aromatic monomer having at least two vinyl groups selected from the group consisting of divinyl benzene, diisopropenyl benzene, trivinyl benzene, divinyl naphthalene, halogen substituted derivatives of divinyl benzene, diisopropenyl benzene, trivinyl benzene and divinyl naphthalene, and mixtures thereof;
(c) a polythiol monomer selected from the group consisting of 2,2'-thiodiethanethiol, pentaerythritol tetrakis(3-mercaptopropionate), pentaerythritol tetrakis(2-mercaptoacetate), tetrakis(7-mercapto-2,5-dithiaheptyl)methane, trimethylolpropane tris(3-mercaptopropionate), trimethylolpropane tris(2-mercaptoacetate), 4-mercaptomethyl-3,6-dithia-1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate), poly(ethylene glycol) di(3-mercaptopropionate), a polythiol monomer represented by the following general formula,

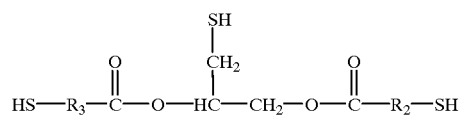

wherein R$_2$ and R$_3$ are each selected from the group consisting of straight or branched chain alkylene, cyclic alkylene, phenylene and C$_1$–C$_9$ alkyl substituted phenylene, and mixtures of such polythiol monomers; and
(d) a comonomer selected from,
  (i) an anhydride monomer selected from the group consisting of methacrylic anhydride, acrylic anhydride, maleic anhydride, 1-cyclopentene-1,2-dicarboxylic anhydride, itaconic anhydride and mixtures thereof;
  (ii) a monomer having at least three (meth)acryloyl groups represented by the following general formula,

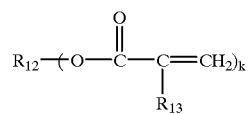

in which R$_{12}$ is a polyvalent radical of a polyol, R$_{13}$ is hydrogen or methyl, and k is a whole number from 3 to 6; and
  (iii) mixtures of monomers (d)(i) and (d)(ii), wherein the amount of each monomer and comonomer are selected such that a polymerizate of said polymerizable composition has a refractive index of at least 1.57 and an Abbe number of at least 33.

18. The polymerizable composition of claim 17 wherein Q is selected from linear or branched C$_2$–C$_{12}$ alkylene, and R$_1$ is methyl; said aromatic monomer is divinyl benzene; said anhydride monomer (d)(i) is methacrylic anhydride; and R$_{12}$ of monomer (d)(ii) is a radical of pentaerythritol, R$_{13}$ is hydrogen and k is 3 or 4.

19. The polymerizable composition of claim 17 further comprising a radically polymerizable comonomer (e) having at least two (meth)acryloyl groups that is selected from the group consisting of:

(i) a monomer represented by the following general formula,

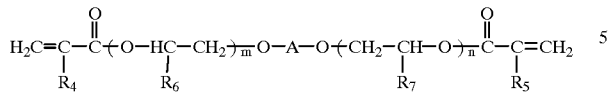

wherein m and n are each a positive number, the sum of m and n being from 0 to 70, $R_4$ and $R_5$ are each hydrogen or methyl, $R_6$ and $R_7$ are each hydrogen or $C_1$ to $C_2$ alkyl, and A is a divalent linking group selected from the group consisting of linear or branched $C_3$–$C_8$ alkylene, cyclic alkylene, phenylene, $C_1$–$C_9$ alkyl substituted phenylene, and a group represented by the following general formula,

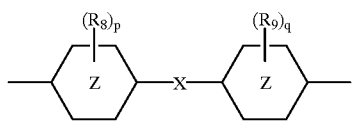

wherein, $R_8$ and $R_9$ are each $C_1$–$C_4$ alkyl, chlorine or bromine,
p and q are each an integer from 0 to 4,

represents a divalent benzene group or a divalent cyclohexane group and X is O, S, —S(O$_2$)—, —C(O)—, —CH$_2$—, —CH=CH—, —C(CH$_3$)$_2$—, —C(CH$_3$)(C$_6$H$_5$)— or

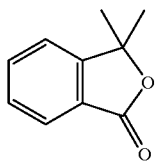

when

is the divalent benzene group, and X is O, S, —CH$_2$—, or —C(CH$_3$)$_2$— when

is the divalent cyclohexane group;
(ii) a bis [(meth)acryloyl-terminated]poly(ethylene glycol) monomer having a number average molecular weight from 200 to 2000 grams/mole;

(iii) a poly(meth)acryloyl terminated monomer represented by the following general formula,

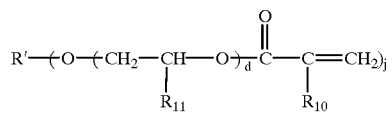

wherein R' is a polyvalent radical of a polyol, $R_{10}$ is hydrogen or methyl, $R_{11}$ is hydrogen or $C_1$ to $C_2$ alkyl, d is a number from 1 to 20, and j is a whole number from 3 to 6; and
(iv) mixtures of polymerizable comonomers (i), (ii) and (iii).

20. The polymerizable composition of claim 19 wherein A is represented by the following general formula,

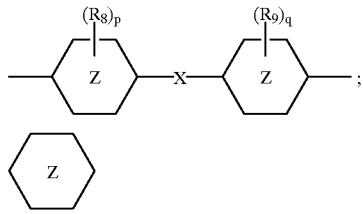

X is —C(CH$_3$)$_2$—; represents a divalent benzene group; p and q are each 0; $R_4$, $R_5$ and $R_{10}$ are each methyl; $R_6$, $R_7$ and $R_{11}$ are each hydrogen; the sum of m and n is from 10 to 30; R' is a radical of trimethylolpropane; and j is 3.

21. The polymerizable composition of claim 17 wherein said first thio(meth)acrylate functional monomer (a)(i) is present in an amount of from 5 percent to 49 percent by weight, based on the total weight of said mixture of thio (meth)acrylate functional monomers, and said second thio (meth)acrylate functional monomer (a)(ii) is present in an amount of from 51 percent to 95 percent by weight, based on the total weight of said mixture of thio(meth)acrylate functional monomers.

22. The polymerizate of claim 1.

23. The polymerizate of claim 17.

24. A photochromic article comprising:
(a) the polymerizate of claim 1; and
(b) a photochromic amount of organic photochromic substance.

25. A photochromic article comprising:
(a) the polymerizate of claim 17; and
(b) a photochromic amount of organic photochromic substance.

26. The photochromic article of claim 25 wherein the organic photochromic substance is selected from the group consisting of spiro(indoline)naphthoxazines, spiro(indoline) benzoxazines, benzopyrans, naphthopyrans, chromenes, organo-metal dithizonates, fulgides and fulgimides and mixtures of such organic photochromic substances.

27. A polymerizable composition comprising:
(a) a mixture of thio(meth)acrylate functional monomers comprising, (i) a first thio(meth)acrylate functional monomer represented by the following general formula,

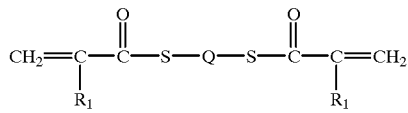

in which $R_1$ is hydrogen or methyl, and Q is a divalent linking group selected from linear or branched $C_2$–$C_{12}$ alkylene, $C_4$–$C_{12}$ cyclic alkylene, $C_6$–$C_{14}$ arylene and $C_7$–$C_{26}$ alkarylene, the carbon chains of Q may optionally contain at least one linkage selected from the group consisting of ether, thioether and combinations thereof; and (ii) a second thio(meth)acrylate functional monomer represented by the following general formula,

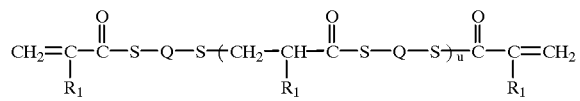

in which $R_1$ and Q have the same meanings as described for monomer (a)(i), and u is an integer from 1 to 10;

(b) an aromatic monomer having at least two vinyl groups;
(c) a polythiol monomer having at least two thiol groups; and
(d) a comonomer represented by methacrylic anhydride, wherein the amount of each monomer and comonomer are selected such that a polymerizate of said polymerizable composition has a refractive index of at least 1.57 and an Abbe number of at least 33.

28. The polymerizable composition of claim 1 wherein said polythiol monomer is thioglycerol bis(2-mercaptoacetate).

29. The polymerizable composition of claim 15 wherein said monomer having a single ethylenically unsaturated radically polymerizable group is phenoxyethyl methacrylate.

30. A polymerizable composition comprising:
(a) a mixture of thio(meth)acrylate functional monomers comprising,
(i) a first thio(meth)acrylate functional monomer represented by the following formula,

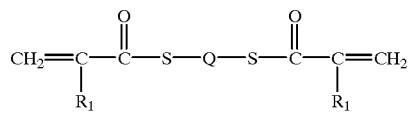

in which $R_1$ represents $CH_3$, and Q represents —$CH_2$—$CH_2$—(S—$CH_2$—$CH_2$)$_n$— wherein n is 0 or 1; and (ii) a second thio(meth)acrylate functional monomer represented by the following formula,

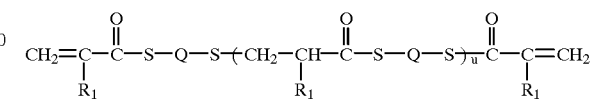

in which $R_1$ and Q have the same meanings as described for monomer (a) (i), and u is an integer from 1 to 10;

(b) an aromatic monomer represented by divinyl benzene;
(c) a polythiol monomer represented by thioglycerol bis(2-mercaptoacetate; and
(d) a comonomer represented by methacrylic anhydride, wherein the amount of each monomer and comonomer are selected such that a polymerizate of said polymerizable composition has a refractive index of at least 1.57 and an Abbe number of at least 33.

31. The polymerizable comprise of claim 1 further comprising bisphenol A dimethacrylate ethoxylated with the (10) moles of ethylene oxide.

32. The polymerizable comprise of claim 17 further comprising bisphenol A dimethacrylate ethoxylated with the (10) moles of ethylene oxide.

* * * * *

UNITED STATES PATENT AND TRADEMARK OFFICE
CERTIFICATE OF CORRECTION

PATENT NO.    : 6,342,571 B1
DATED         : January 29, 2002
INVENTOR(S)   : Robert A. Smith et al.

It is certified that error appears in the above-identified patent and that said Letters Patent is hereby corrected as shown below:

Column 21,
Line 49, "linearor" should be -- linear or --.

Column 24,
Line 30, "X is -C(CH$_3$)$_2$-; represents a divalent benzene group:" should be -- X is -C(CH$_3$)$_2$-;  represents a divalent benzene group; --.

Column 26,
Line 39, "comprise" should be -- composition --.
Line 40, "the" should be -- ten --.

Signed and Sealed this

Tenth Day of June, 2003

JAMES E. ROGAN
*Director of the United States Patent and Trademark Office*